US012593310B2

(12) United States Patent
Desai et al.

(10) Patent No.: US 12,593,310 B2
(45) Date of Patent: **\*Mar. 31, 2026**

(54) NOTIFICATION HANDLING BASED ON PHYSICAL PRESENCE

(71) Applicant: Motorola Mobility LLC, Chicago, IL (US)

(72) Inventors: Rahul B. Desai, Hoffman Estates, IL (US); Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 29 days.

This patent is subject to a terminal disclaimer.

(21) Appl. No.: 18/539,839

(22) Filed: Dec. 14, 2023

(65) Prior Publication Data

US 2024/0114482 A1 Apr. 4, 2024

Related U.S. Application Data

(63) Continuation of application No. 17/462,281, filed on Aug. 31, 2021.

(51) Int. Cl.
| | |
|---|---|
| *H04W 68/02* | (2009.01) |
| *G06V 40/16* | (2022.01) |
| *H04W 4/38* | (2018.01) |
| *H04W 8/18* | (2009.01) |

(52) U.S. Cl.
CPC .......... *H04W 68/02* (2013.01); *G06V 40/172* (2022.01); *H04W 4/38* (2018.02); *H04W 8/18* (2013.01)

(58) Field of Classification Search
CPC ......... H04W 4/38; H04W 8/18; H04W 8/186;

H04W 68/00; H04W 68/02; H04W 40/172; H04W 76/50; H04L 2012/2849; H04L 12/2829; H04M 1/72412; H04M 1/72436; H04M 1/72454; H04M 1/72418;

(Continued)

(56) References Cited

U.S. PATENT DOCUMENTS

| | | | |
|---|---|---|---|
| 7,020,460 | B1 | 3/2006 | Sherman et al. |
| 8,923,824 | B1 | 12/2014 | Masterman |
| 9,402,167 | B2 | 7/2016 | Barat et al. |

(Continued)

FOREIGN PATENT DOCUMENTS

| | | |
|---|---|---|
| CN | 110234025 A | 9/2019 |
| WO | 2006108288 A1 | 10/2006 |

OTHER PUBLICATIONS

U.S. Appl. No. 17/473,312, "Corrected Notice of Allowability", U.S. Appl. No. 17/473,312, Jul. 17, 2024, 3 pages.

(Continued)

*Primary Examiner* — Jean A Gelin
(74) *Attorney, Agent, or Firm* — FIG. 1 Paents

(57) ABSTRACT

Techniques for notification handling based on identity and physical presence are described and may be implemented to determine whether to route a notification from a first device (e.g., a mobile device) to a second device (e.g., a display device) for output at the second device. Generally, the described implementations utilize sensor data captured at a physical location to detect and/or identify persons present at the physical location and to determine whether to route notifications between devices based on the detected persons/ identities.

20 Claims, 10 Drawing Sheets

(58) Field of Classification Search

CPC ............. H04M 2250/16; G06V 40/172; G06F 1/3231; G06F 1/3265; G06F 3/0484

USPC ......................................................... 455/458

See application file for complete search history.

(56) References Cited

U.S. PATENT DOCUMENTS

| | | | |
|---|---|---|---|
| 9,491,374 B1 | 11/2016 | Avrahami et al. | |
| 9,686,088 B2 | 6/2017 | Papakipos et al. | |
| 9,801,158 B1 | 10/2017 | Yuan et al. | |
| 10,117,074 B2* | 10/2018 | Nordstrom | G06F 16/583 |
| 10,147,141 B1 | 12/2018 | Rixford | |
| 10,387,098 B2 | 8/2019 | Park et al. | |
| 10,531,039 B1 | 1/2020 | Bender et al. | |
| 10,554,921 B1 | 2/2020 | Lim et al. | |
| 10,575,145 B1* | 2/2020 | Nordstrom | H04W 4/12 |
| 10,733,629 B2* | 8/2020 | Busch | H04W 4/30 |
| 11,231,844 B2 | 1/2022 | Steeves | |
| 11,368,579 B1 | 6/2022 | Palanivel | |
| 11,390,140 B1* | 7/2022 | Simons | B60H 1/00971 |
| 11,410,778 B2 | 8/2022 | Ravindranathan et al. | |
| 11,583,760 B1 | 2/2023 | Agrawal et al. | |
| 11,641,440 B2 | 5/2023 | Agrawal et al. | |
| 11,720,237 B2 | 8/2023 | Meirhaeghe et al. | |
| 11,902,936 B2* | 2/2024 | Desai | H04W 8/18 |
| 12,101,832 B2 | 9/2024 | Snow et al. | |
| 12,225,383 B2 | 2/2025 | Agrawal et al. | |
| 2003/0061611 A1 | 3/2003 | Pendakur | |
| 2006/0112349 A1 | 5/2006 | Clow et al. | |
| 2007/0101293 A1 | 5/2007 | Cherry et al. | |
| 2007/0112926 A1 | 5/2007 | Brett et al. | |
| 2007/0124507 A1 | 5/2007 | Gurram et al. | |
| 2008/0177844 A1 | 7/2008 | McCarthy et al. | |
| 2008/0250408 A1 | 10/2008 | Tsui et al. | |
| 2009/0204881 A1 | 8/2009 | Murthy et al. | |
| 2012/0050183 A1 | 3/2012 | Lee | |
| 2012/0226742 A1 | 9/2012 | Momchilov et al. | |
| 2012/0289203 A1 | 11/2012 | Santo et al. | |
| 2013/0100017 A1 | 4/2013 | Papakipos et al. | |
| 2014/0006634 A1 | 1/2014 | Eacott et al. | |
| 2014/0098038 A1 | 4/2014 | Paek et al. | |
| 2014/0192137 A1 | 7/2014 | Kim et al. | |
| 2014/0277843 A1 | 9/2014 | Langlois et al. | |
| 2014/0280578 A1 | 9/2014 | Barat et al. | |
| 2014/0320398 A1 | 10/2014 | Papstein | |
| 2014/0349757 A1 | 11/2014 | Nogami et al. | |
| 2015/0019391 A1* | 1/2015 | Kumar | G06Q 10/087 705/28 |
| 2015/0110255 A1 | 4/2015 | Williams et al. | |
| 2015/0237598 A1 | 8/2015 | Yoshitomi et al. | |
| 2015/0365820 A1 | 12/2015 | White et al. | |
| 2016/0210011 A1 | 7/2016 | Ho | |
| 2016/0227278 A1 | 8/2016 | Bugajski et al. | |
| 2016/0283063 A1 | 9/2016 | Missig et al. | |
| 2016/0285974 A1 | 9/2016 | Shurtleff et al. | |
| 2017/0078428 A1 | 3/2017 | Unter Ecker | |
| 2017/0277498 A1 | 9/2017 | Wood, Jr. et al. | |
| 2017/0353569 A1 | 12/2017 | Kozma et al. | |
| 2019/0132903 A1 | 5/2019 | Suxena | |
| 2019/0156788 A1 | 5/2019 | Lee et al. | |
| 2019/0182113 A1 | 6/2019 | Alam et al. | |
| 2019/0191214 A1 | 6/2019 | Mandavilli et al. | |
| 2019/0294268 A1 | 9/2019 | Koyama et al. | |
| 2019/0378519 A1 | 12/2019 | Dunjic et al. | |
| 2020/0099545 A1 | 3/2020 | Hong et al. | |
| 2020/0167699 A1 | 5/2020 | Cohen | |
| 2020/0201615 A1 | 6/2020 | Biswas et al. | |
| 2020/0202696 A1* | 6/2020 | Hankey | G08B 21/0453 |
| 2020/0341457 A1* | 10/2020 | Prugh | G01L 1/242 |
| 2020/0342737 A1* | 10/2020 | Pham | A61B 5/1112 |
| 2020/0343347 A1* | 10/2020 | Yamazaki | H10D 62/80 |
| 2020/0356243 A1 | 11/2020 | Meyer et al. | |
| 2020/0356254 A1 | 11/2020 | Missig et al. | |
| 2021/0084556 A1 | 3/2021 | Gunnalan et al. | |
| 2021/0097208 A1 | 4/2021 | Donahue et al. | |
| 2021/0181922 A1 | 6/2021 | Chang et al. | |
| 2021/0211902 A1 | 7/2021 | Achyuth et al. | |
| 2021/0248483 A1 | 8/2021 | Tomasik et al. | |
| 2021/0274416 A1 | 9/2021 | Jendli et al. | |
| 2021/0349627 A1 | 11/2021 | Chang et al. | |
| 2022/0070371 A1 | 3/2022 | Bushman et al. | |
| 2022/0070389 A1 | 3/2022 | Tangeland et al. | |
| 2022/0239785 A1 | 7/2022 | Daniel Marcelino Barbeira et al. | |
| 2022/0343347 A1* | 10/2022 | Koch | G06F 3/013 |
| 2022/0391647 A1 | 12/2022 | Shi et al. | |
| 2023/0041046 A1 | 2/2023 | Agrawal et al. | |
| 2023/0045005 A1 | 2/2023 | Meirhaeghe et al. | |
| 2023/0063665 A1 | 3/2023 | Snow et al. | |
| 2023/0067649 A1 | 3/2023 | Desai et al. | |
| 2023/0085250 A1 | 3/2023 | Agrawal et al. | |
| 2023/0319574 A1 | 10/2023 | Agrawal et al. | |
| 2023/0319575 A1 | 10/2023 | Agrawal et al. | |
| 2024/0283826 A1 | 8/2024 | Ganguli et al. | |

OTHER PUBLICATIONS

U.S. Appl. No. 17/473,312, "Notice of Allowance", U.S. Appl. No. 17/473,312, Jun. 6, 2024, 9 pages.

"Auto Hotspot, How to | Samsung Galaxy S10 Plus", YouTube Video uploaded by Omarr Ghafoor [online][retrieved Jun. 23, 2021]. Retrieved from the Internet <https://www.youtube.com/watch?v=2V6s31zA7p4>., Oct. 30, 2019, 4 Pages.

"Check your phone's notifications in Samsung DeX", Samsung Electronics America, Inc. [retrieved Jul. 16, 2021]. Retrieved from the Internet <https://www.samsung.com/us/support/answer/ANS00062702/>., 2019, 3 Pages.

"Do you know about Auto Hotspot?", Samsung [retrieved Jun. 23, 2021]. Retrieved from the Internet <https://r2.community.samsung.com/t5/Tech-Talk/Do-you-know-about-Auto-Hotspot/td-p/2967111>., Dec. 4, 2019, 5 Pages.

"How do you automatically activate Mobile hotspot via Bluetooth connection on Windows 10 Mobile?", in: Windows Central Forums [online][retrieved Jul. 12, 2021]. Retrieved from the Internet <https://forums.windowscentral.com/ask-question/452584-how-do-you-automatically-activate-mobile-hotspot-via-bluetooth-connection-windows-10-mobile.html>., Feb. 19, 2017, 11 Pages.

"Instant Hotspot on your Mac", Apple Inc. [retrieved Jun. 23, 2021]. Retrieved from the Internet <https://support.apple.com/guide/macbook-air/instant-hotspot-apdae69c81f1/mac>., Feb. 2019, 2 Pages.

"Non-Final Office Action", U.S. Appl. No. 17/395,405, Dec. 27, 2021, 11 pages.

"Setting up Auto Hotspot on my Samsung phone", Samsung [retrieved Jun. 23, 2021]. Retrieved from the Internet <https://www.samsung.com/au/support/mobile-devices/setup-auto-hotspot/>., Oct. 20, 2020, 8 Pages.

Pratik , "How to Use Your Phone as a Drawing Pad for PC", TechWiser Blog [online][retrieved Jun. 8, 2021]. Retrieved from the Internet <https://techwiser.com/use-phone-as-drawing-pad-for-pc/>., Jul. 15, 2020, 12 pages.

U.S. Appl. No. 17/395,405, , "Final Office Action", U.S. Appl. No. 17/395,405, Jun. 22, 2022, 38 pages.

U.S. Appl. No. 17/395,405, , "Non-Final Office Action", U.S. Appl. No. 17/395,405, Oct. 28, 2022, 39 pages.

U.S. Appl. No. 17/395,405, , "Notice of Allowance", U.S. Appl. No. 17/395,405, May 10, 2023, 9 pages.

U.S. Appl. No. 17/395,405, , "Supplemental Notice of Allowability", U.S. Appl. No. 17/395,405, Jul. 10, 2023, 15 pages.

U.S. Appl. No. 17/395,405, , "Supplemental Notice of Allowability", U.S. Appl. No. 17/395,405, Jun. 28, 2023, 7 pages.

U.S. Appl. No. 17/397,002, , "Non-Final Office Action", U.S. Appl. No. 17/397,002, Aug. 3, 2022, 25 pages.

U.S. Appl. No. 17/397,002, , "Notice of Allowance", U.S. Appl. No. 17/397,002, Nov. 16, 2022, 9 pages.

U.S. Appl. No. 17/397,002, , "Supplemental Notice of Allowability", U.S. Appl. No. 17/397,002, Jan. 19, 2023, 3 pages.

U.S. Appl. No. 17/462,281, , "Non-Final Office Action", U.S. Appl. No. 17/462,281, Apr. 26, 2023, 13 pages.

U.S. Appl. No. 17/462,281, , "Notice of Allowability", U.S. Appl. No. 17/462,281, Oct. 12, 2023, 3 pages.

(56) References Cited

OTHER PUBLICATIONS

U.S. Appl. No. 17/462,281, , "Notice of Allowance", U.S. Appl. No. 17/462,281, Sep. 14, 2023, 12 pages.

U.S. Appl. No. 17/473,312, , "Final Office Action", U.S. Appl. No. 17/473,312, Feb. 22, 2024, 24 pages.

U.S. Appl. No. 17/473,312, , "Non-Final Office Action", U.S. Appl. No. 17/473,312, Oct. 27, 2023, 24 pages.

U.S. Appl. No. 17/473,384, , "Non-Final Office Action", U.S. Appl. No. 17/473,384, Oct. 6, 2022, 14 pages.

U.S. Appl. No. 17/473,384, , "Notice of Allowance", U.S. Appl. No. 17/473,384, Feb. 24, 2023, 8 pages.

U.S. Appl. No. 17/473,384, , "Supplemental Notice of Allowability", U.S. Appl. No. 17/473,384, Mar. 31, 2023, 2 pages.

Agrawal, Amit Kumar et al., "U.S. Application as Filed", U.S. Appl. No. 17/473,384, filed Sep. 13, 2021, 68 pages.

Agrawal, Amit Kumar et al., "U.S. Application as Filed", U.S. Appl. No. 17/397,002, filed Aug. 9, 2021, 82 pages.

Bohn, Dieter , "Chromebook Instant Tethering expands beyond Google devices and phones", The Verge Blog, Vox Media, LLC. [online][retrieved Jun. 23, 2021]. Retrieved from the Internet <https://www.theverge.com/2019/2/4/18210378/chromebook-instant-tethering-android-mobile-hotspot-chrome-os-expansion>., Feb. 4, 2019, 6 Pages.

Cipriani, Jason , "How to use Apple's Instant Hotspot feature", CNET [online][retrieved Jun. 23, 2021]. Retrieved from the Internet <https://www.cnet.com/how-to/how-to-use-apples-instant-hotspot-feature/>., Feb. 7, 2019, 4 Pages.

Desai, Rahul B. et al., "U.S. Application as Filed", U.S. Appl. No. 17/462,281, filed Aug. 31, 2021, 57 pages.

GB2210269.3, , "Combined Search and Examination Report", GB Application No. GB2210269.3, Feb. 27, 2023, 9 pages.

Heinisch, Christian , "HotSpot Automatic (free)", Google Play [retrieved Jul. 12, 2021]. Retrieved from the Internet <https://play.google.com/store/apps/details?id=de.christian_heinisch.hotspot.enablehotspot&hl=en_US&gl=US>., Jun. 7, 2018, 3 Pages.

Meirhaeghe, Olivier D. et al., "U.S. Application as Filed", U.S. Appl. No. 17/395,405, filed Aug. 5, 2021, 80 pages.

Russell, Brandon , "Galaxy S21 features wireless support for Samsung DeX on PC", XDA Developers Blog [online][retrieved Mar. 30, 2022]. Retrieved from the Internet <https://www.xda-developers.com/galaxy-s21-wireless-support-samsung-dex-on-pc/>., Feb. 5, 2021, 7 pages.

Snow, Jeffrey T. et al., "U.S. Application as Filed", U.S. Appl. No. 17/473,312, filed Sep. 13, 2021, 48 pages.

Tappert, Charles C. et al., "Chapter 6—English Language Handwriting Recognition Interfaces", In: Text Entry Systems: Mobility, Accessibility, Universality, Morgan Kaugmann [retrieved Jun. 27, 2022]. Retrieved from the Internet <https://doi.org/10.1016/B978-012373591-1/50006-1>, 2007, pp. 123-137.

"Corrected Notice of Allowability", U.S. Appl. No. 17/709,697, Jan. 10, 2025, 2 pages.

"Notice of Allowance", U.S. Appl. No. 17/709,697, Nov. 20, 2024, 10 pages.

* cited by examiner

100

400

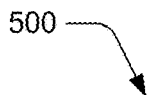
500
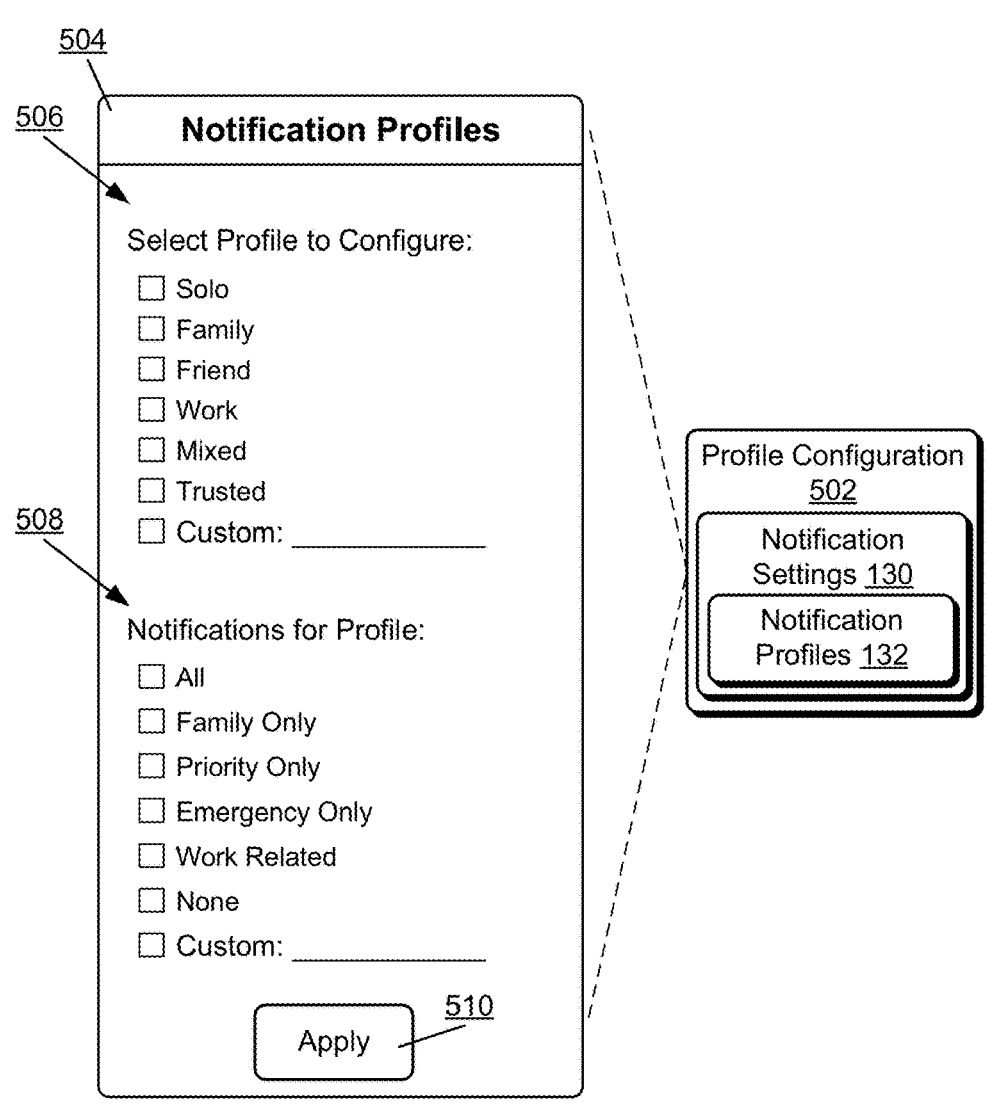
*Fig. 5*

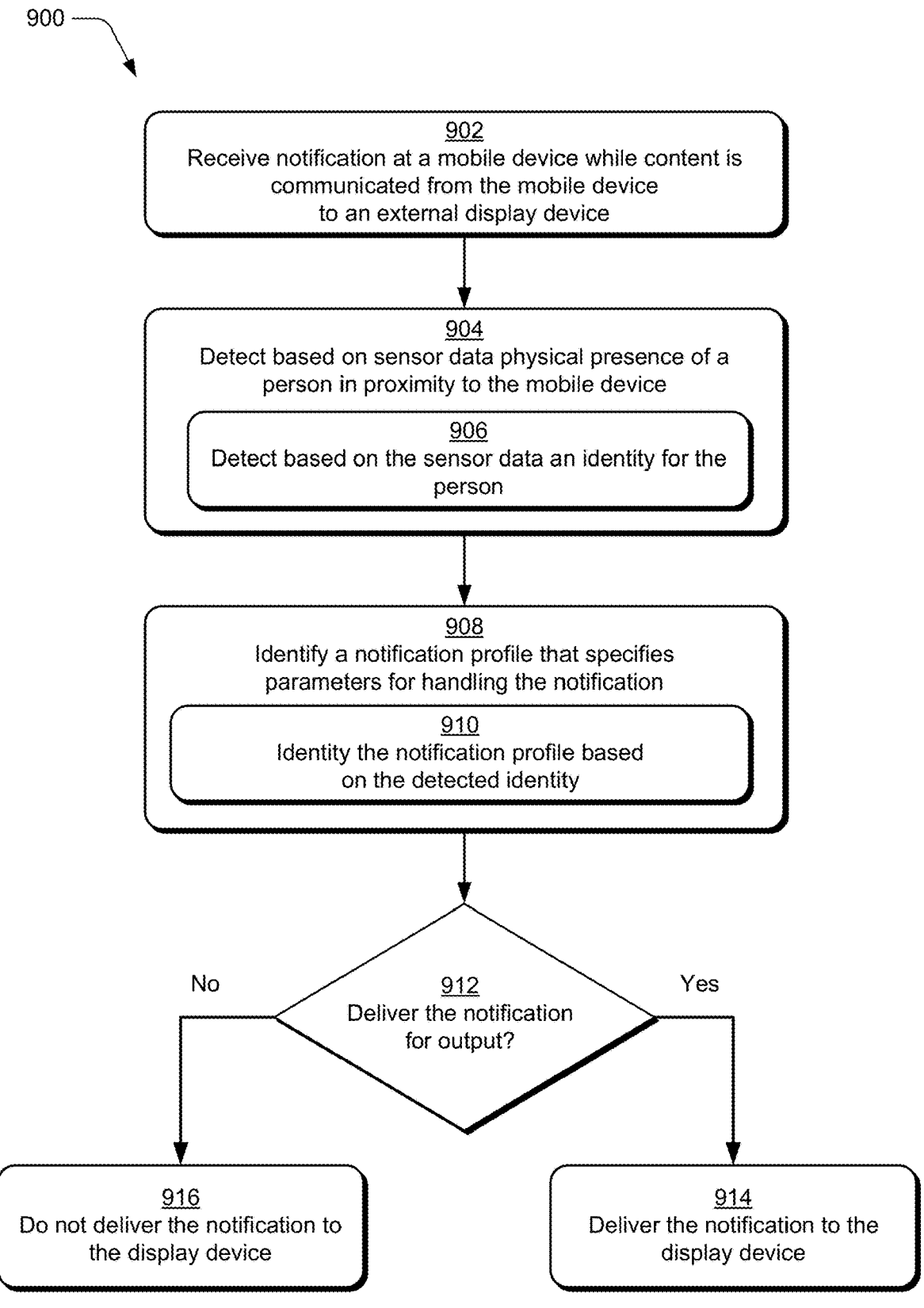

900

902
Receive notification at a mobile device while content is communicated from the mobile device to an external display device

904
Detect based on sensor data physical presence of a person in proximity to the mobile device

906
Detect based on the sensor data an identity for the person

908
Identify a notification profile that specifies parameters for handling the notification

910
Identity the notification profile based on the detected identity

912
Deliver the notification for output?

No                                                                     Yes

916
Do not deliver the notification to the display device

914
Deliver the notification to the display device

*Fig. 9*

NOTIFICATION HANDLING BASED ON PHYSICAL PRESENCE

RELATED APPLICATIONS

This application is a continuation of and claims priority to U.S. patent application Ser. No. 17/462,281, titled Notification Handling based on Identity and Physical Presence and filed on Aug. 31, 2021, which is hereby incorporated by reference in its entirety.

BACKGROUND

Today's person is afforded a tremendous selection of devices that are capable of performing a multitude of tasks. For instance, desktop and laptop computers provide computing power and screen space for productivity and entertainment tasks. Further, smartphones and tablets provide computing power and communication capabilities in highly portable form factors. Many people have access to multiple different devices and use of a particular device depends on the person's current status, such as on the go, in the office, at home, and so forth. While individual instances of devices provide functionality for discrete sets of tasks, the ability for devices to intercommunicate with one another greatly expands available task options and operating environments. For instance, a typical smartphone is able to wirelessly cast visual content to a larger screen device to enable enhanced enjoyment of the content.

While the ability for devices to intercommunicate provides for numerous usage scenarios it also introduces challenges when it comes to determining how to handle notifications that occur while devices are connected. For instance, while a smartphone is communicating content (e.g., video content) to another device for output, notifications such as incoming text messages and phone calls to the phone may occur. Depending on various settings of the phone the notifications interrupt content output or are ignored by the phone such that the user is unaware of the notifications. Current ways for handling such notifications typically utilize static logic and don't consider various environmental and/or state information in determining how to handle notifications.

BRIEF DESCRIPTION OF THE DRAWINGS

Aspects of notification handling based on identity and physical presence are described with reference to the following Figures. The same numbers may be used throughout to reference similar features and components that are shown in the Figures. Further, identical numbers followed by different letters reference different instances of features and components described herein:

FIG. 5 depicts an implementation scenario for configuring notification profile settings in accordance with one or more implementations;

FIG. 9 illustrates a flow chart depicting an example method for processing a notification in accordance with one or more implementations.

DETAILED DESCRIPTION

Figure 1:
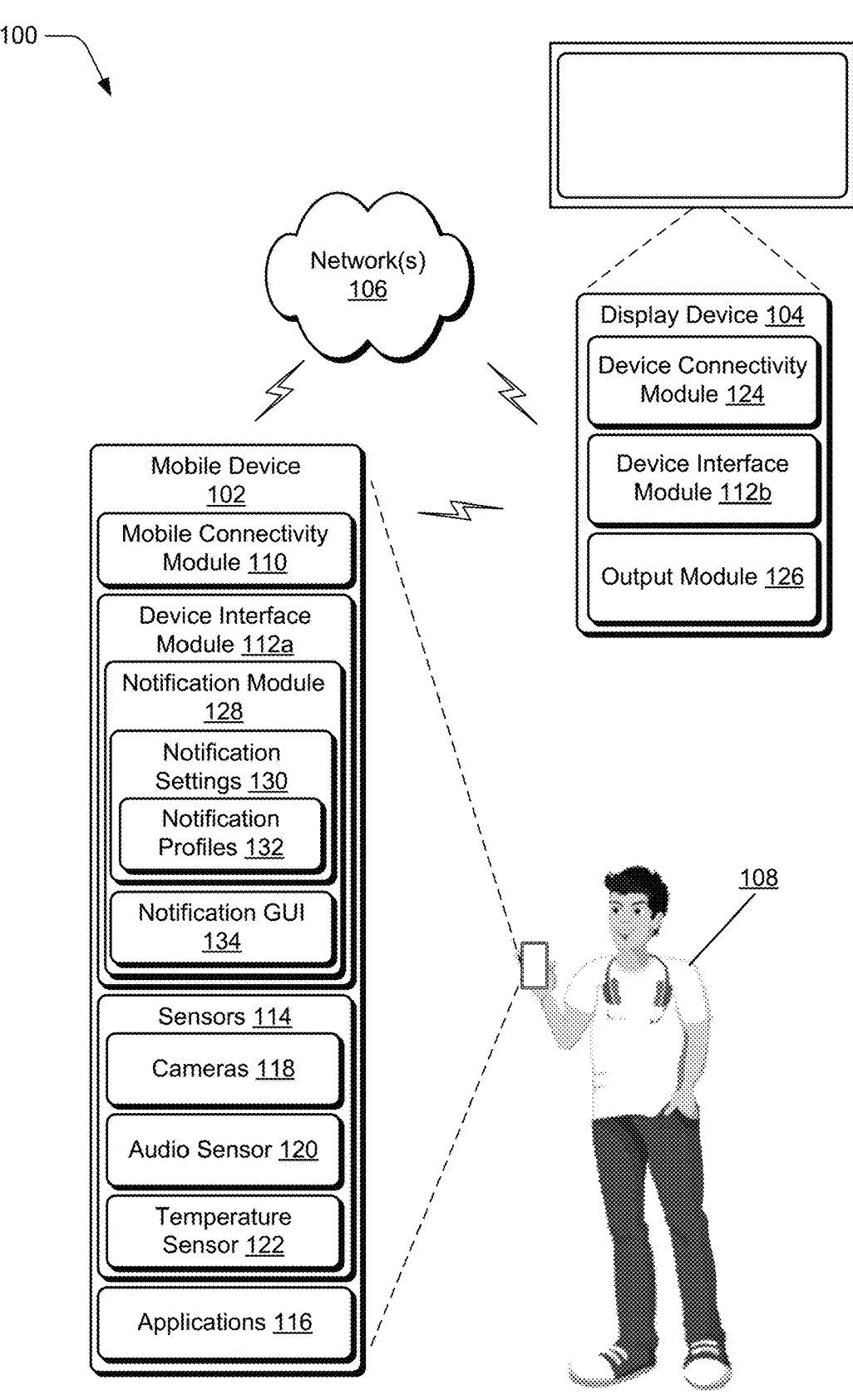
FIG. 1 illustrates an example environment in which aspects of notification handling based on identity and physical presence can be implemented.

Techniques for notification handling based on identity and physical presence are described and may be implemented to determine whether to route a notification from a first device (e.g., a mobile device) to a second device (e.g., a display device) for output at the second device. Generally, the described implementations utilize sensor data captured at a physical location to detect and/or identify persons present at the physical location and to determine whether to route notifications between devices based on the detected persons/identities. This provides for greater automation and user convenience than is provided by traditional techniques for routing notifications between devices.

For instance, consider a scenario where a mobile device (e.g., a smartphone) is in physical proximity to a display device, such as a display device that is external to the mobile device. The mobile device and the display device, for example, are able to intercommunicate, such as via wireless and/or wired connectivity. While the mobile device and the display device are in physical proximity, the mobile device establishes data connectivity with the display device and communicates content to the display device for output. The mobile device, for instance, utilizes the display device to output content obtained and/or generated by the mobile device.

Further, while the mobile device is communicating content for output by the display device, the mobile device receives a notification. The mobile device, for instance, receives a wireless notification such as an incoming phone call, a text message, a media message, and so forth. Accordingly, to determine whether to deliver the notification to the display device for output, the mobile device obtains sensor data that describes various state conditions for a physical environment in which the mobile device and/or the display device are positioned. The sensor data, for example, includes state information such as captured visual attributes, sound, temperature, motion, etc. The mobile device processes the sensor data to attempt to determine whether a person and/or persons are present in the physical environment. For instance, the mobile device determines that the sensor data includes human attributes such as facial features, physical dimensions, voice features, and so forth. The mobile device then compares the human attributes to known attributes for identities of known persons to attempt to identify a person and/or persons present in the physical environment.

In at least one implementation the mobile device matches the captured sensor data to a known identity and/or a set of known identities. For instance, an identity of a user of the mobile device is identified along with an identity of a different person. Based on the identities a notification profile is identified that specifies based on the detected identities whether to deliver the notification to the display device for output. Different notification profiles, for example, are utilized that each specify whether to deliver a notification based on a detected identity and/or set of identities. For instance, when only a user of the mobile device is detected a notification profile is selected that indicates that notifications are to be delivered to the display device for output, such as all received notifications. In another example where the user is detected along with another identity such as a family member and/or a friend a notification profile is selected that indicates that only notifications of a particular type (e.g., priority notifications or notifications from a preferred contact list) are to be delivered to the display device for output. Various other notification profiles can be utilized that are based on various types and combinations of identities. Accordingly, based on a selected notification profile the mobile device determines whether to deliver the notification to the display device for output.

In at least one implementation received sensor data may not be usable to determine an identity of a person present in proximity to the mobile device and/or the display device. For instance, physical features captured for a particular person may not match features for a known identity and thus the person may be unrecognized by the mobile device. Alternatively or additionally the mobile device is positioned such that visual features of a person are not able to be captured, e.g., when a camera of the mobile device is positioned such that visual features of persons are not in view of the camera. Accordingly, other sensor data can be utilized such as sound data, temperature data, and so forth. For instance, where sensor data indicates that an unrecognized person is present, a notification profile is selected based on an unrecognized identity. The notification profile, for example, specifies that only emergency notifications are to be delivered or that no notifications are to be delivered.

Accordingly, the techniques described herein enable notification handling in a variety of different scenarios based on sensor data and detected identities. For instance, in response to various captured sensor data, the descried techniques determine whether to deliver notifications and/or which types of notifications to deliver. Further, the described techniques are automated and are able to determine whether to deliver a notification and which types of notifications to deliver without user interaction to specify whether to deliver received notifications.

While features and concepts of notification handling based on identity and physical presence can be implemented in any number of environments and/or configurations, aspects the described techniques are described in the context of the following example systems, devices, and methods. Further, the systems, devices, and methods described herein are interchangeable in various ways to provide for a wide variety of implementations and operational scenarios.

FIG. 1 illustrates an example environment 100 in which aspects of notification handling based on identity and physical presence can be implemented. The environment 100 includes a mobile device 102 and a display device 104 that are interconnectable in various ways to enable content from the mobile device 102 to be displayed by the display device 104. The mobile device 102 and the display device 104, for instance, are interconnectable via a network 106 and/or via direct inter-device connectivity, e.g., via direct wireless and/or wired connectivity between the mobile device 102 and the display device 104. In this particular example, the mobile device 102 represents a portable device that can be carried by a user 108, such as a smartphone or a tablet device. The user 108, for instance, represents a registered user of the mobile device 102.

Further, the display device 104 represents functionality for various types of content output, such as output of visual and audible content. The display device 104 can be implemented in various ways, such as a television (e.g., a smart TV), a display panel, a projector display, a computing device with an associated display device (e.g., the computing device 1000 discussed below with reference to FIG. 10), and so forth. In at least one implementation the display device 104 represents a dedicated display device configured to output visual content generated by other devices, such as content generated at the mobile device 102 and transmitted to the display device 104 for display. Alternatively or additionally the display device 104 includes computing functionality, such as discussed with reference to the computing device 1000. These examples are not to be construed as limiting, however, and the mobile device 102 and/or the display device 104 can be implemented in a variety of different ways and form factors. Example attributes of the mobile device 102 and the display device 104 are discussed below with reference to the device 1000 of FIG. 10.

The mobile device 102 includes various functionality that enables the mobile device 102 to perform different aspects of notification handling based on identity and physical presence discussed herein, including a mobile connectivity module 110, a device interface module 112a, sensors 114, and applications 116. The mobile connectivity module 110 represents functionality (e.g., logic and hardware) for enabling the mobile device 102 to interconnect with other devices and/or networks, such as the display device 104 and the network 106. The mobile connectivity module 110, for instance, enables wireless and/or wired connectivity of the mobile device 102. The device interface module 112a represents functionality for enabling the mobile device 102 to interface with other devices. As further detail below, for instance, the device interface module 112a enables the mobile device 102 to establish wireless and/or wired data communication with other devices, e.g., the display device 104.

The sensors 114 are representative of functionality to detect various physical and/or logical phenomena in relation to the mobile device 102, such as motion, light, image detection and recognition, time and date, position, location, touch detection, sound, temperature, and so forth. Examples of the sensors 114 include hardware and/or logical sensors such as an accelerometer, a gyroscope, a camera, a microphone, a clock, biometric sensors, touch input sensors, position sensors, environmental sensors (e.g., for temperature, pressure, humidity, and so on), geographical location information sensors (e.g., Global Positioning System (GPS) functionality), and so forth. In this particular example the sensors 114 include cameras 118, an audio sensor 120, and a temperature sensor 122. The sensors 114, however, can include a variety of other sensor types in accordance with the implementations discussed herein.

The applications 116 represent functionality for performing different computing tasks via the mobile device 102, such as gaming, media consumption (e.g., content streaming), productivity tasks (e.g., word processing, content generation, data analysis, etc.), content generation, web browsing, communication with other devices, and so forth.

The display device 104 includes various functionality that enables the display device 104 to perform different aspects of notification handling based on identity and physical presence discussed herein, including a device connectivity module 124, a device interface module 112*b*, and an output module 126. The device connectivity module 124 represents functionality (e.g., logic and hardware) for enabling the display device 104 to interconnect with other devices and/or networks, such as the mobile device 102 and the network 106. The device connectivity module 124, for instance, enables wireless and/or wired connectivity of the display device 104. Generally, the mobile device 102 and the display device 104 are configured to intercommunicate via a variety of different wireless protocols, such as wireless broadband, Wireless Local Area Network (WLAN) (e.g., Wi-Fi), Wi-Fi Direct, wireless short distance communication (e.g., Bluetooth™ (including Bluetooth™ Low Energy (BLE)), Near Field Communication (NFC)), and so forth.

The device interface module 112*b* is representative of functionality for enabling the display device 104 to interface with other devices. For instance, the device interface module 112*b* interfaces with the device interface module 112*a* of the mobile device 102 to enable collaborative data communication between the display device 104 and the mobile device 102. The output module 126 represents functionality for enabling content output by the display device 104, such as visual content and audible content. The output module 126, for instance, includes a display driver and/or other logic and hardware for outputting content by the display device 104.

According to implementations for notification handling based on identity and physical presence, for example, the device interface module 112*a* includes a notification module 128 that enables notifications received at the mobile device 102 to be handled in various ways, such as presented on the display device 104. The notification module 128, for example, includes notification settings 130 that indicate how various notifications are to be handled, such as based on notification type and detected state conditions. For instance, the notification settings 130 include notification profiles 132 that each specify a specific set of notification handling parameters, such as particular types of notifications that are to be delivered when a particular set of environmental conditions are detected.

As further detailed below, for example, when a notification is received at the mobile device 102, the notification module 128 determines based on sensor data from the sensors 114 various environmental state conditions pertaining to the mobile device 102 and/or the display device 104. The notification module 128 compares the environmental state conditions to the notification settings 130 to identify a particular notification profile 132 and to determine, based on the particular notification profile 132, whether to cause the notification to be presented on the display device 104. In at least one implementation the notification module 128 utilizes sensor data received from the sensors 114 to determine, based on the notification settings 130 and the notification profiles 132, whether and/or how to present notifications via the display device 104. The notification module 128, for example, exposes a notification graphical user interface (GUI) 134 that is delivered to the display device 104 and that enables the display device 104 to present notifications received at the mobile device 102.

Having discussed an example environment in which the disclosed techniques can be performed, consider now some example scenarios and implementation details for implementing the disclosed techniques.

Figure 2:
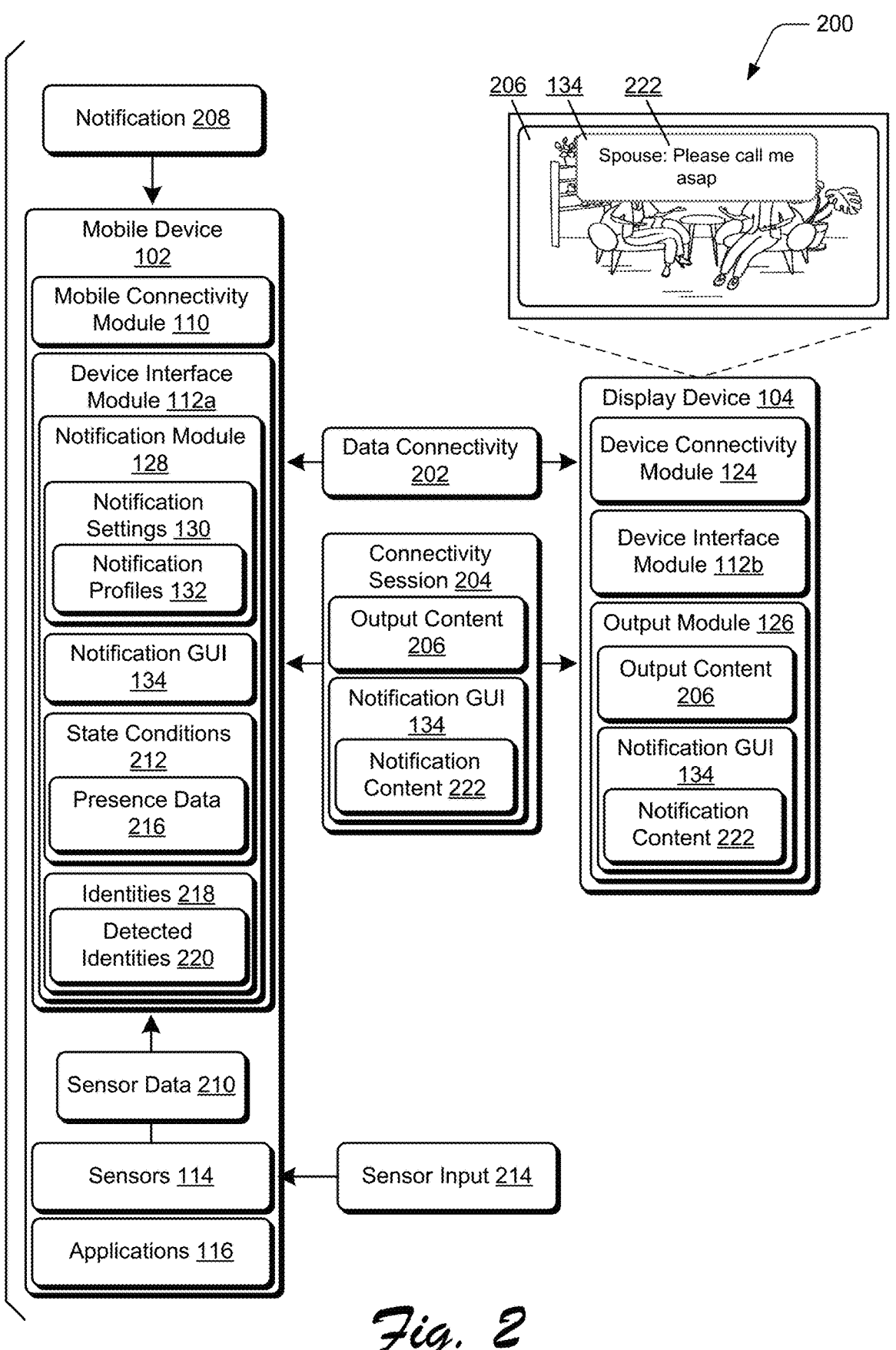
FIG. 2 depicts an example system for implementing aspects of notification handling based on identity and physical presence in accordance with one or more implementations.

FIG. 2 depicts an example system 200 for implementing aspects of notification handling based on identity and physical presence in accordance with one or more implementa-tions. Generally, the system 200 can be implemented in the environment 100 and incorporates attributes of the environment 100 introduced above.

In the system 200 the mobile connectivity module 110 and the device connectivity module 124 interface to establish data connectivity 202 between the mobile device 102 and the display device 104. Generally, the data connectivity 202 is implemented via wireless and/or wired connectivity between the mobile device 102 and the display device 104 for exchanging data between the devices. The data connec-tivity 202, for instance, is implemented via direct wireless and/or wired connectivity between the mobile device 102 and the display device 104, and/or via data communication over the network 106 between the mobile device 102 and the display device 104. In a wireless scenario the data connec-tivity 202 can be established as direct device-to-device connectivity between the mobile device 102 and the display device 104 and utilizing any suitable wireless protocol, such as Wi-Fi Direct, Bluetooth™ (including Bluetooth™ Low Energy (BLE), ultra-wideband (UWB), Near Field Commu-nication (NFC)), LTE direct, NR sidelink, and so forth.

Utilizing the data connectivity 202 a connectivity session 204 is established between the mobile device 102 and the display device 104 that enables the mobile device 102 to communicate output content 206 to the display device 104 for output. In at least one implementation the connectivity session 204 is established via intercommunication between the device interface module 112*a* of the mobile device 102 and the device interface module 112*b* of the display device 104. The output content 206 can take various forms such as digital video, images, audio, application interfaces, etc. In at least one implementation the output content 206 is generated by an instance of the applications 116. Accordingly, the output module 126 of the display device 104 causes the output content 206 to be output via the display device 104.

Further to the system 200 the mobile device 102 receives a notification 208. Generally, the notification 208 can occur based on various events such as an incoming phone call, a text message, a media message, a message relating to an instance of an application 116 (e.g., a social media update), and so forth. In response to receiving the notification 208 the notification module 128 retrieves sensor data 210 from the sensors 114 and determines state conditions 212 based on the sensor data 210. The sensors 114, for instance, receive sensor input 214 based on various environmental conditions pertaining to the mobile device 102 and/or the display device 104. Generally, the sensor input 214 includes various sensed environmental attributes such as captured images, light, sound, temperature, and so forth. The sensors 114 then generate the sensor data 210 based on the sensor input 214 and communicate the sensor data 210 to the notification module 128. The sensor data 210, for instance, represents data that describes the sensor input 214.

The notification module 128 processes the sensor data 210 to determine the state conditions 212, which includes gen-erating presence data 216 that describes attributes of human presence detected from the sensor data 210. The presence data 216 can take various forms such as facial features, anatomical dimensions, voice features, temperature, and so forth. Accordingly, the notification module 128 compares the presence data 216 to human identities 218 to determine whether any persons are recognized as being present in proximity to the mobile device 102 and/or the display device 104. The identities 218, for instance, include identifiers for different persons and identifying attributes for different persons, such as facial features, anatomical dimensions, voice features, age, relationship information such as relative to a user of the mobile device 102, demographic identifiers, and so forth. For example, the notification module 128 compares sensed human attributes from the presence data 216 to known human attributes for instances of the identities 218 to determine whether the presence of a human with a known identity is detected. Based on comparison of the presence data 216 to the identities 218, the notification module 128 identifies detected identities 220 that correspond to persons recognized from the presence data 216.

Accordingly, the notification module 128 compares the detected identities 220 to the notification settings 130 to determine a notification profile 132 that specifies how to handle the notification 208. The notification settings 130, for instance, specify various notification handling rules based on different state conditions 212, such as based on identities of persons detected in proximity to the mobile device 102 and/or the display device 104. For instance, whether the notification 208 is communicated to the display device 104 for output depends on which instances and/or types of the identities 218 are detected and a notification profile 132 that corresponds to the detected identities 220. Further, if it is determined that the notification 208 is to be presented on the display device 104, how the notification 208 is presented may depend on which instances and/or types of the identities 218 are detected, such as specified by a corresponding notification profile 132. Further aspects of using identities to determine whether and/or how to present notifications are detailed below.

Further to the system 200 the notification module 128 determines that based on the detected identities 220 and a corresponding notification profile 132, an indication of the notification 208 is to be presented on the display device 104, e.g., in conjunction with output of the output content 206. Accordingly, the notification module 128 generates an instance of a notification GUI 134 and populates the notification GUI 134 with notification content 222 that includes information describing the notification 208. The notification content 222, for instance, identifies a person (e.g., an identity 218) that sent the notification, describes a notification type for the notification 208 (e.g., phone call, text message, media message, etc.), and may include content from the notification 208 such as text, images, audio content, etc. The notification module 128 communicates the notification GUI 134 with the notification content 222 to the display device 104 and the output module 126 causes the notification GUI 134 with the notification content 222 to be output on the display device 104. In at least one implementation the notification GUI 134 is output while the output content 206 is output, such as via overlay of the notification GUI 134 over the output content 206. Alternatively or additionally output of the output content 206 is paused and the notification GUI 134 is output on the display device 104 while the output content 206 is paused.

Figure 3:
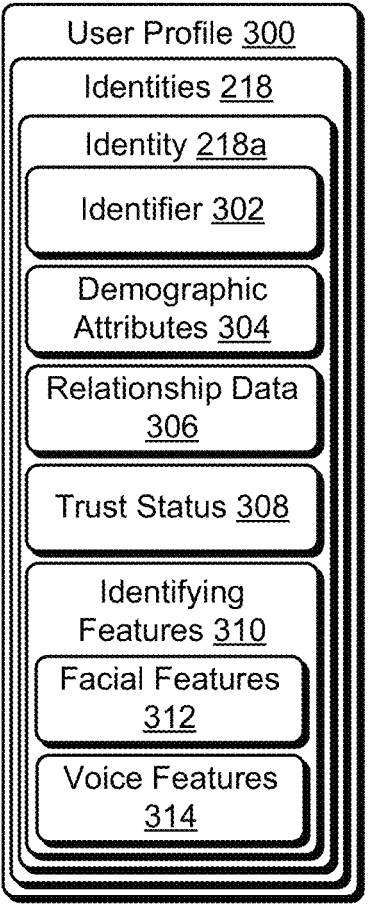
FIG. 3 depicts an example user profile that can be utilized to determine whether and/or how to present notifications in accordance with one or more implementations.

FIG. 3 depicts an example user profile 300 that can be utilized to determine whether and/or how to present notifications in accordance with one or more implementations. The user profile 300, for instance, represents a user profile for a user of the mobile device 102, e.g., the user 108. In this particular example the user profile 300 includes the identities 218 which generally represents identify profiles for different persons associated with the user profile 300, such as a contacts list for the user 108. Each identity 218 includes information about a respective person associated with the identity. For instance, consider an identity 218a which represents an instance of the identities 218. The identity 218a includes identity attributes such as:

Identifier 302: This attribute represents an identifier and/ or set of identifiers for the identity 218a such as a person's name, nickname, a machine-generated identifier, and so forth.

Demographic Attributes 304: This attribute includes various demographic information for a person associated with the identity 218a, such as age, gender identity, citizenship, and so forth.

Relationship Data 306: This attribute identifies a relationship and/or set of relationships for a person associated with the identity 218a relative to a person associated with the user profile 300. Examples of such relationships include family relationship (e.g., spouse, child, parent, or other familial relationship), social relationship (e.g., friend, acquaintance, etc.), enterprise relationship (e.g., supervisor, employee, client, etc.), and so forth.

Trust Status 308: This attribute indicates as trust status of the identity 218a, such as trusted, trust status not known, untrusted, and so forth. A person associated with the user profile 300, for instance, specifies a trust status for instances of the identities 218. Alternatively or additionally the notification module 128 automatically specifies trust status for instances of the identities 218, such as based on relationship data 306. For instance, close family members may be identified as trusted, whereas identities associated with social and/or enterprise relationships may be identified as untrusted.

Identifying Features 310: This attribute includes different identifying features for a person associated with the identity 218a, such as physical features. In this particular example the identifying features 310 include facial features 312 and voice features 314. The facial features 312 and the voice features 314, for instance, enable a person associated with the identity 218a to be differentiated from other persons. These identifying features 310 are presented for purpose of example only and it is to be appreciated that a variety of other features (e.g., physical features) may be utilized for instances of the identities 218 in accordance with the disclosed implementations.

The identity 218a is presented for purpose of example only and the identities 218 includes a variety of different identities with specific attributes and attribute values. Accordingly, the various attributes of the identities 218 can be utilized for distinguishing different persons and for determining how to handle notifications that are received in conjunction with output of content.

Figure 4:
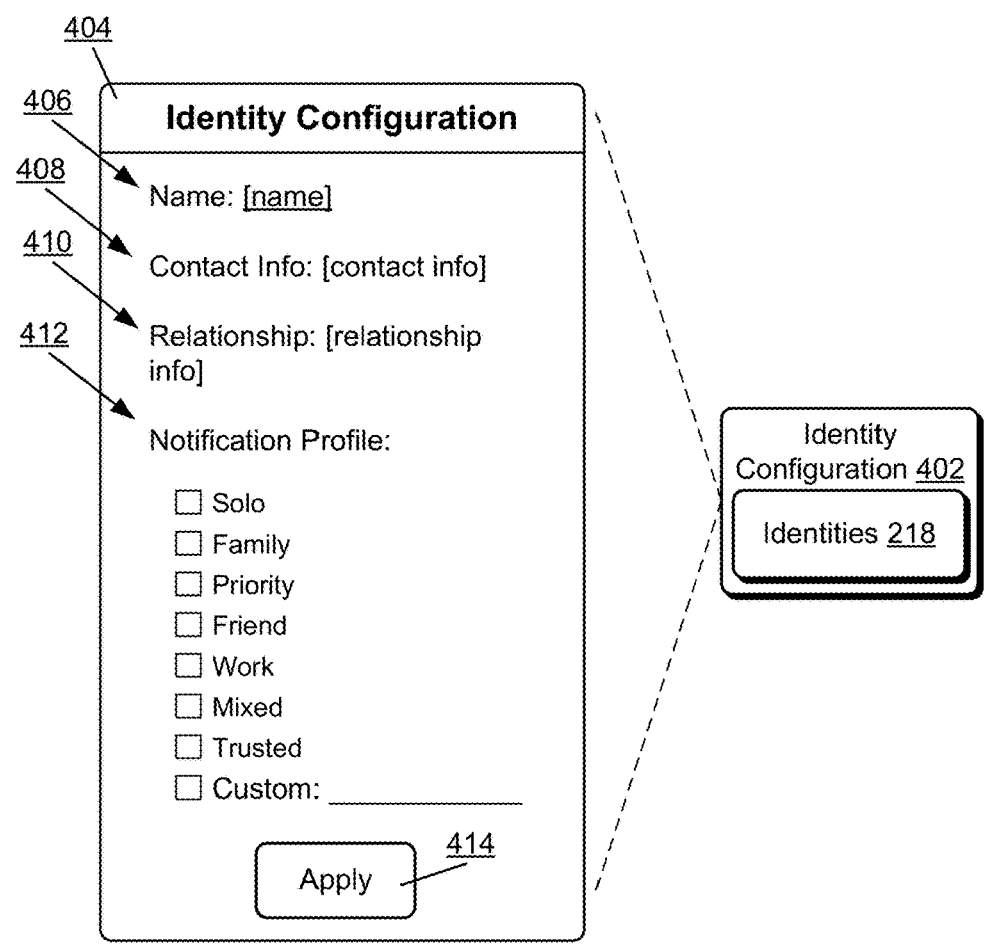
FIG. 4 depicts an implementation scenario for configuring notification settings for an identity in accordance with one or more implementations.

FIG. 4 depicts an implementation scenario 400 for configuring notification settings for an identity in accordance with one or more implementations. In the scenario 400 an identity configuration process 402 is implemented such as by the device interface module 112a and/or the notification module 128. The identity configuration 402, for instance, enables instances of the identities 218 to be configured. As part of the identity configuration 402 an identity configuration GUI 404 is presented that includes various fields for receiving input to configure attributes of an identity. The identity configuration GUI 404, for instance, includes a name field 406, a contact info field 408, a relationship field 410, and a notification profile field 412.

The name field 406 is configured to receive input to specify a name and/or other identifier for an identity. The contact info field 408 is configured to receive contact information for an identity, such as physical address, email address, phone number, social media identifiers, and so forth. The relationship field 410 is configured to receive input to specify a relationship for an identity, such as relationship to a user of the mobile device 102. Examples of different relationships include family (e.g., spouse, child, parent, etc.), friend, work related (e.g., coworker), and so forth.

The notification profile field 412 is configured to receive input to select a particular notification profile 132 for an identity and includes various instances of selectable notification profiles 132 including "Solo," "Family," "Priority," "Friend," "Work," "Mixed," and "Trusted." Generally, these notification profiles 132 represent preconfigured system profiles such as included as part of the notification module 128. The notification profile field 412 also includes a "Custom" notification profile which is configured to receive input to identify a particular user-specified notification profile. As further described below, each of these notification profiles is configurable to specify which notification types are to be delivered when a particular identity is detected. While a user may specify a particular notification profile 132 to be used for a particular identity 218, the notification module 128 is configured to automatically select a notification profile 132 for a particular identity 218 and/or set of identities 218, such as based on attributes of the identity 218.

The identity configuration GUI 404 also includes an apply control 414 which is selectable to apply the information and settings specified in the identity configuration GUI 404 to a particular identity.

FIG. 5 depicts an implementation scenario 500 for configuring notification profile settings in accordance with one or more implementations. In the scenario 500 a profile configuration process 502 is implemented such as by the device interface module 112*a* and/or the notification module 128. The profile configuration 502, for instance, enables notification profiles 132 included as part of the notification settings 130 to be configured. As part of the profile configuration 502 a notification configuration GUI 504 is presented that includes various fields for receiving input to configure attributes of notification profiles 132. The notification configuration GUI 504, for instance, includes a profile name field 506 and a notification type field 508.

The profile name field 506 includes various preconfigured profile names such as "Solo," "Family," "Friend," "Work," "Mixed," and "Trusted." These particular notification profiles, for instance, represent preconfigured system profiles such as included as part of the notification module 128. Generally, the "Solo" profile corresponds to a particular person that is detected individually without other persons, such as the user 108 of the mobile device 102. The "Family" profile corresponds to persons detected that are identified as family members, such as based on their relationship identified in the identities 218. The "Friend" profile corresponds to persons detected that are identified as friends, such as based on their relationship identified in the identities 218. The "Work" profile corresponds to persons detected that are identified as work-related, such as based on their relationship identified in the identities 218. The "Mixed" profile corresponds to persons detected that include a mixture of identities 218 (e.g., family, friends, coworkers) and/or persons that are unrecognized, e.g., not identified in the identities 218. The "Trusted" profile corresponds to persons detected that are identified as trusted, such as based on their relationship identified in the identities 218. The profile name field 508 also includes a "Custom" profile name which is configured to receive user input to generate a custom notification profile.

The notification type field 508 identifies different types of notifications that can be received. For instance, for a particular notification profile 132 selected from the profile name field 506 a user can select notification types from the notification type field 508 to be delivered when the selected notification profile is active. For instance, the "All" notification type represents all notifications received by the mobile device 102. The "Family Only" notification type represents notifications received from identities indicated as having a family relationship, e.g., in the identities 218. The "Priority Only" notification type represents notifications indicated as priority notifications, such as notifications from identities indicated as priority identities. For instance, as part of the identity configuration 402 specific identities are identified as priority identities for notification purposes. Alternatively or additionally specific types of identities are automatically identified as priority identities such as based on relationship status, e.g., family, friend, work relationship, etc. The "Emergency Only" notification type represents notifications that are indicated as emergency notifications. In at least one implementation an emergency notification represents a type of priority notification. The "Work Related" notification type represents notifications that pertain to work subject matter, such as notifications from identities 218 indicated as having a work relationship to a user of the mobile device 102. The "None" option indicates that no notifications are to be delivered. The "Custom" option enables a user to create a custom notification type, such as to identify specific persons and/or user profiles for which notifications are to be delivered.

The notification configuration GUI 504 also includes an apply control 510 that is selectable to apply the various settings from the notification configuration GUI 504, such as to configure the notification settings 130.

Figure 6:
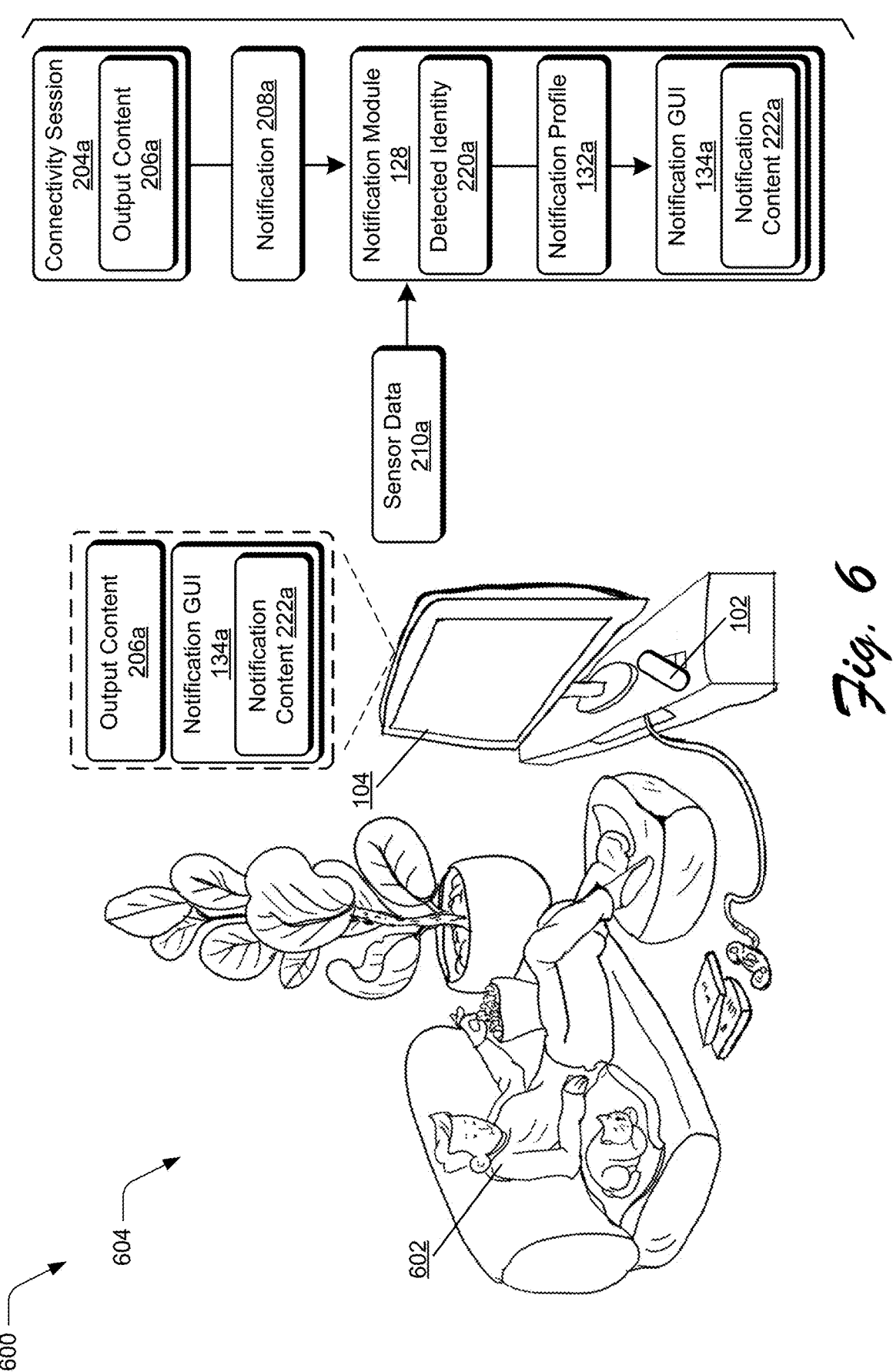
FIG. 6 depicts a scenario for controlling a notification based on detected identities in accordance with one or more implementations.

FIG. 6 depicts a scenario 600 for controlling a notification based on detected identities in accordance with one or more implementations. In the scenario 600 a person 602 is viewing output content 206*a* on the display device 104 as part of a connectivity session 204*a* between the mobile device 102 and the display device 104. The output content 206*a*, for instance, is communicated from the mobile device 102 to the display device 104 for display. Further, the person 602, the mobile device 102, and the display device 104 are present in a physical environment 604. In at least one implementation the mobile device 102 is positioned such that visual features of the environment 604 are able to be captured by a camera 118 of the mobile device 102.

In conjunction with output of the output content 206*a* the mobile device 102 receives a notification 208*a*. Accordingly, the notification module 128 determines detected identities 220*a* based on sensor data 210*a*. The sensor data 210*a*, for instance, includes image capture data of visual features of the environment 604 captured by the camera 118. The sensor data 210*a* may also include other captured environmental conditions such as sound, temperature, motion, etc. Based on the sensor data 210*a* the notification module 128 detects presence of the person 602, such as based on recognizing facial features of the person 602 in the sensor data 210*a*. Further, the notification module 128 compares the sensor data 210*a* to the identities 218 to match the sensor data 210*a* to the detected identity 220*a*.

Based on the detected identity 220*a* the notification module 128 identifies a notification profile 132*a* that corresponds to the detected identity 220*a*. The notification profile 132*a*, for instance, indicates types of notifications that are to be delivered and/or how notifications are to be delivered when the detected identity 220*a* is determined to be present. For instance, the detected identity 220*a* corresponds to a user of the mobile device 102, e.g., a determination that the person 602 matches an identity of a user of the mobile device 102. Further, no other persons besides the identity 220a are detected from the sensor data 210a. The notification profile 132a, for instance, corresponds to a "Solo" notification profile where only a user of the mobile device 102 is detected. For example, the notification profile 132a indicates that all notifications are to be delivered. Accordingly, based on the notification profile 132a, the notification module 128 generates a notification GUI 134a and populates the notification GUI 134a with notification content 222a that describes the notification 208a. The notification module 128 then communicates the notification GUI 134a with the notification content 222a to the display device 104 and the display device 104 displays the notification GUI 134a with the notification content 222a. In at least one implementation the notification GUI 134a is visually overlaid on the output content 206a. Alternatively or additionally playback of the output content 206a is paused while the notification GUI 134a is output.

Generally, the person 602 can respond to the notification 208a in various ways. For instance, the person 602 can utilize a controller for the display device 104 (e.g., a remote controller) to interact with the notification GUI 134a displayed on the display device 104, such as to select the notification GUI 134a to obtain additional information about the notification 208a and/or to dismiss the notification GUI 134a. Additionally or alternatively the person 602 can provide input to the mobile device 102 to handle the notification 208a.

Figure 7:
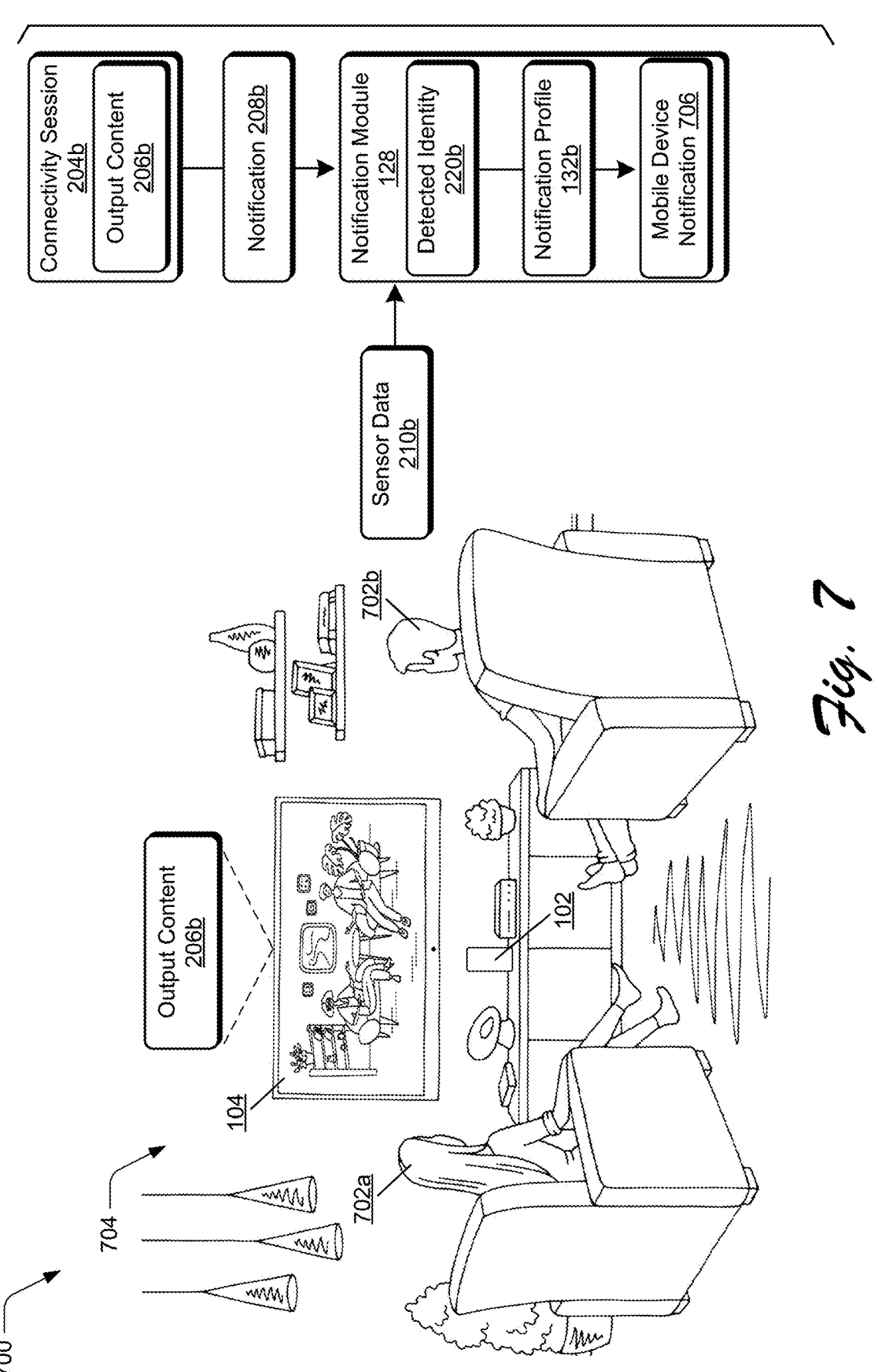
FIG. 7 depicts a scenario for controlling a notification based on detected identities in accordance with one or more implementations.

FIG. 7 depicts a scenario 700 for controlling a notification based on detected identities in accordance with one or more implementations. In the scenario 700 persons 702a, 702b are viewing output content 206b on the display device 104 as part of a connectivity session 204b between the mobile device 102 and the display device 104. The output content 206b, for instance, is communicated from the mobile device 102 to the display device 104 for display. Further, the persons 702a, 702b, the mobile device 102, and the display device 104 are present in a physical environment 704. In at least one implementation the mobile device 102 is positioned such that visual features of the environment 704 are able to be captured by a camera 118 of the mobile device 102.

In conjunction with output of the output content 206b the mobile device 102 receives a notification 208b. Accordingly, the notification module 128 determines detected identities 220b based on sensor data 210b. The sensor data 210b, for instance, includes image capture data of visual features of the environment 704 captured by the camera 118. The sensor data 210b may also include other captured environmental conditions such as sound, temperature, motion, etc. Based on the sensor data 210b the notification module 128 detects presence of the persons 702a, 702b, such as based on recognizing facial features of the persons 702a, 702b in the sensor data 210b. Further, the notification module 128 compares the sensor data 210b to the identities 218 to match the sensor data 210b to the detected identities 220b.

Based on the detected identities 220b the notification module 128 identifies a notification profile 132b that corresponds to the detected identities 220b. The notification profile 132b, for instance, indicates types of notifications that are to be delivered and/or how notifications are to be delivered when the detected identities 220b are determined to be present. For instance, the detected identities 220b indicate that the person 702a is a user of the mobile device 102 and the person 702b is identified as a family member with the person 702a. The notification profile 132b, for instance, corresponds to a "Family Only" notification profile where family members are detected. In at least one implementation, the notification profile 132b indicates that only priority notifications and/or notifications from other family members are to be delivered when family members are detected.

Accordingly, the notification module 128 determines that the notification 208b is not a priority notification or a notification from another family member, and thus does not deliver the notification to the display device 104 for display. In at least one implementation the notification 208b is output on the mobile device 102 as a mobile device notification 706 but is not communicated to the display device 104 for output. Alternatively, if the notification module 128 determines that the notification 208b is a priority notification and/or a notification from another family member, the notification module communicates the notification 208b to the display device 104 for output.

Figure 8:
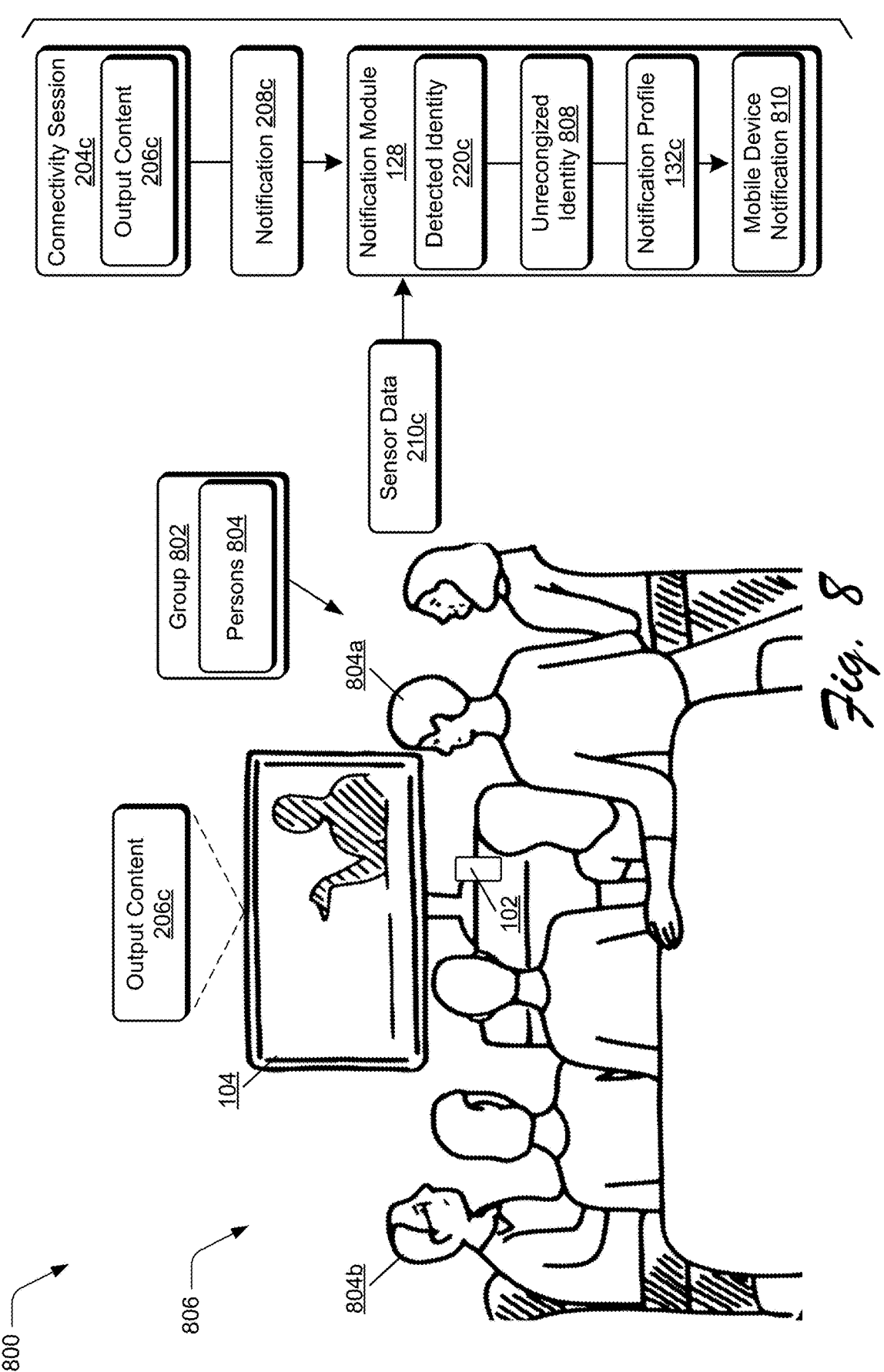
FIG. 8 depicts a scenario for controlling a notification based on detected identities in accordance with one or more implementations.

FIG. 8 depicts a scenario 800 for controlling a notification based on detected identities in accordance with one or more implementations. In the scenario 800 a group 802 of persons 804 are viewing output content 206c on the display device 104 as part of a connectivity session 204c between the mobile device 102 and the display device 104. The output content 206c, for instance, is communicated from the mobile device 102 to the display device 104 for display. Further, the persons 804, the mobile device 102, and the display device 104 are present in a physical environment 806. In at least one implementation the mobile device 102 is positioned such that visual features of the environment 806 are able to be captured by a camera 118 of the mobile device 102.

In conjunction with output of the output content 206c the mobile device 102 receives a notification 208c. Accordingly, the notification module 128 receives sensor data 210c and attempts to determine identities of the persons 804. The sensor data 210c, for instance, includes image capture data of visual features of the environment 806 captured by the camera 118. The sensor data 210c may also include other captured environmental conditions such as sound, temperature, motion, etc. Based on the sensor data 210c the notification module 128 detects the presence of the persons 804. Further, the notification module 128 compares features of the persons 804 (e.g., facial and/or other physical features) to the identities 218 to attempt to identify identities for the persons 804. In this particular example the notification module 128 identifies detected identities 220c that correspond to recognized identities 218. The detected identities 220c, for instance, include a person 804a that is recognized as a user of the mobile device 102. The notification module 128, however, also detects an unrecognized identity 808. For instance, the notification module 128 determines that physical features of a person 804b do not match a known identity from the identities 218.

Based on the detected identities 220c and the unrecognized identity 808 the notification module 128 identifies a notification profile 132c. The notification profile 132b, for instance, indicates types of notifications that are to be delivered and/or how notifications are to be delivered when the detected identities 220c and an unrecognized identity 808 are determined to be present. The notification profile 132c, for instance, corresponds to a "Mixed" notification profile where a user of the mobile device is detected as well as an unknown person. In at least one implementation, the notification profile 132c indicates that only emergency notifications are to be delivered when an unrecognized identity is detected.

Accordingly, the notification module 128 determines that the notification 208c is not an emergency notification and thus does not deliver the notification 208c to the display device 104 for display. In at least one implementation the notification 208c is output on the mobile device 102 as a mobile device notification 810 but is not communicated to the display device 104 for output. Alternatively, if the notification module 128 determines that the notification 208c is an emergency notification, the notification module 128 communicates the notification 208c to the display device 104 for output.

While the scenarios presented above are discussed with reference to determining identities in conjunction with receiving a notification, it is to be appreciated that the described implementations can track identities present in an environment dynamically and in real time, e.g., not dependent on receiving a notification. For instance, when the mobile device 102 begins communicating content to the display device 104 for output, the mobile device 102 initiates identity tracking such as by capturing sensor data 210 and attempting to determine identities 218 that are present in a surrounding environment. Thus when a notification is received during content output the notification module 128 already has data describing identities 218 that are present and can select an appropriate notification profile 132 for handling the notification.

Further, while the scenarios are described with reference to utilizing camera data for identity recognition (e.g., facial recognition), it is to be appreciated that other types of sensor data may be utilized. For instance, captured sound data may be utilized to perform voice recognition to recognize present identities. Further, temperature data may be utilized to determine that multiple persons are present. This can be particularly useful in scenarios where a camera of the mobile device 102 is not positioned to capture image data of persons present in a particular environment.

FIG. 9 illustrates a flow chart depicting an example method 900 for processing a notification in accordance with one or more implementations. At 902 a notification is received at a mobile device while content is communicated from the mobile device to an external display device. The mobile device 102, for instance, communicates content to the display device 104 for output, such as in conjunction with a connectivity session. The display device 104 outputs the content, such as video content, images, audio content, and so forth. In conjunction with (e.g., during) output of the content the mobile device 102 receives a notification. Generally, different types of notifications can be received such as an incoming phone call, a text message, a media message, an application-related notification, and so forth.

At 904 based on sensor data collected by a sensor system, physical presence of a person is detected in proximity to the mobile device. The sensors 114, for instance, collect sensor input from various environmental conditions in proximity to the mobile device 102 and/or the display device 104. Examples of the sensor input include visual features such as images of physical objects and/or non-visual sensor input such as sound, temperature, motion, and so forth. The sensors 114 communicate sensor data based on the sensor input to the notification module 128.

At 906 based on the sensor data an identity for a person is detected from the sensor data. The notification module 128, for instance, matches the sensor data to features of the identities 218 to identify a person and/or group of persons that are in physical proximity to the mobile device 102 and/or the display device 104. Various identifying features can be utilized such as facial features, physical attributes (e.g., size, body dimensions), voice recognition, and so forth. In at least one implementation step 906 is optional such as in scenarios where features for detecting an identity are not present in sensor data and/or whether detected features do not match a known identity.

At 908 based on the physical presence of the person a notification profile is identified that specifies one or more parameters for handling the notification. For instance, at 910 based on the detected identity the notification profile is identified. In at least one implementation a detected identity 218 is correlated to a corresponding notification profile 132 that specifies how notifications are to be handled with the identity is detected. Alternatively or additionally, where multiple identities 218 are detected, relationships between the identities can be utilized to identity a corresponding notification profile 132. For instance, when an identity corresponds to a user of the mobile device 102 (e.g., a registered user of the mobile device 102) without other persons present, a "Solo" notification profile 132 is selected such that all notifications are delivered for output by the display device 104. As another example, where identities of detected persons have a family relationship, a "Family" notification profile 132 is selected such that only family-related notifications (e.g., notifications identified as being from a family members) and/or priority notifications are to be delivered. As yet another example where identities of detected persons have a work relationship a "Work" notification profile 132 is selected such that only work-related notifications (e.g., notifications identified as being from a work associates) and/or emergency notifications are to be delivered.

In at least one implementation an unrecognized identity is detected, e.g., the notification module 128 processes sensor data to detect a person with features that do not match a particular identity 218. Accordingly, a "Mixed" notification profile 132 can be used based on the unknown identity. The "Mixed" notification profile, for instance, indicates that only emergency notifications are to be delivered, or that no notifications are to be delivered.

In at least one implementation the physical presence of the person is detected based on sensor data that is non-visual such as sound, temperature, motion, and so forth. Further, the non-visual sensor data may not identify specific instances of persons, e.g., specific identities 218. The non-visual sensor data, however, may indicate that multiple persons are present, such as based on detecting multiple different voices, a temperature profile for multiple persons, and so forth. Accordingly, the "Mixed" notification profile 132 can be selected such that only emergency notifications are delivered, or no notifications are delivered.

At 912 it is determined based on parameters of the selected notification profile whether to deliver the notification for output by the external display device. For instance, a notification type for the notification is compared with parameters of the selected notification profile 132 to determine whether the notification is to be delivered. If the notification is identified as an emergency notification, for example, and the notification profile 132 indicates to allow emergency notifications, the notification is delivered to the display device 104 for output. If the notification is a non-emergency notification, however, and the notification profile 132 indicates to only allow emergency notifications, the notification is not delivered to the display device 104 for output. Various other criteria for determining whether to deliver a notification are discussed throughout this disclosure.

If the notification profile indicates that the notification is to be delivered ("Yes"), at 914 the notification is delivered to the display device. For instance, if a notification type for the notification matches an allowed notification type indicated by the selected notification profile 132, the notification module 128 causes the notification to be communicated to the display device 104 for output. If the notification profile indicates that the notification is not to be delivered ("No") at 916 the notification is not delivered. For instance, if a notification type for the notification does not match an allowed notification type indicated by the selected notification profile 132, the notification module 128 does not communicate the notification to the display device 104 for output. In at least one implementation, a notification is presented on the mobile device 102 even in scenarios where it is determined to not deliver the notification to the display device 104 for output.

Generally, the method 900 is performed automatically and without user interaction to determine whether to deliver a notification. For instance, when the mobile device 102 initiates content delivery to the display device 104 for output, the notification module 128 begins collecting sensor data and determining physical presence of persons and identities to determine appropriate notification profiles 132. The notification module 128, for example, only processes incoming notifications using the notification profiles 132 when the mobile device 102 is communicating content to the display device 104 for output. For instance, when the mobile device 102 is not communicating content to the display device 102, the notification profiles 132 are not in an active state for notification handling. Accordingly, when a notification is received while the mobile device 102 is communicating content to the display device 104 for output, the notification module 128 compares a notification type for the notification to an active notification profile to determine whether to deliver the notification for output by the display device 104.

In at least one implementation the method 900 is performed dependent on a type of content being delivered from the mobile device 102 to the display device 104. For instance, if the content being communicated from the mobile device 102 to the display device 104 at step 902 is media content (e.g., entertainment-related content such as television content, movie content, gaming content, etc.) and a notification is received, the method proceeds as described above to select a notification profile for handling the notification. However, in an example implementation, if work-related content (e.g., as part of a user's employment and/or other work-related activity) is being communicated by the mobile device 102 to the display device 104 and a notification is received, the notification may be delivered regardless of the notification type. For instance, when the mobile device 102 is in a work mode (e.g., mobile desktop mode) and work-related content is being communicated by the mobile device 102, all notifications are delivered for output by the display device 104. The notification profiles 132, for instance, include a work-related notification profile that specifies that all notifications are to be delivered when work-related content is being delivered. Alternatively the notification module 128 bypasses the method 900 when work-related content is being delivered such that all notifications received at the mobile device 102 are delivered for output by the display device 104.

The example methods described above may be performed in various ways, such as for implementing different aspects of the systems and scenarios described herein. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 10:
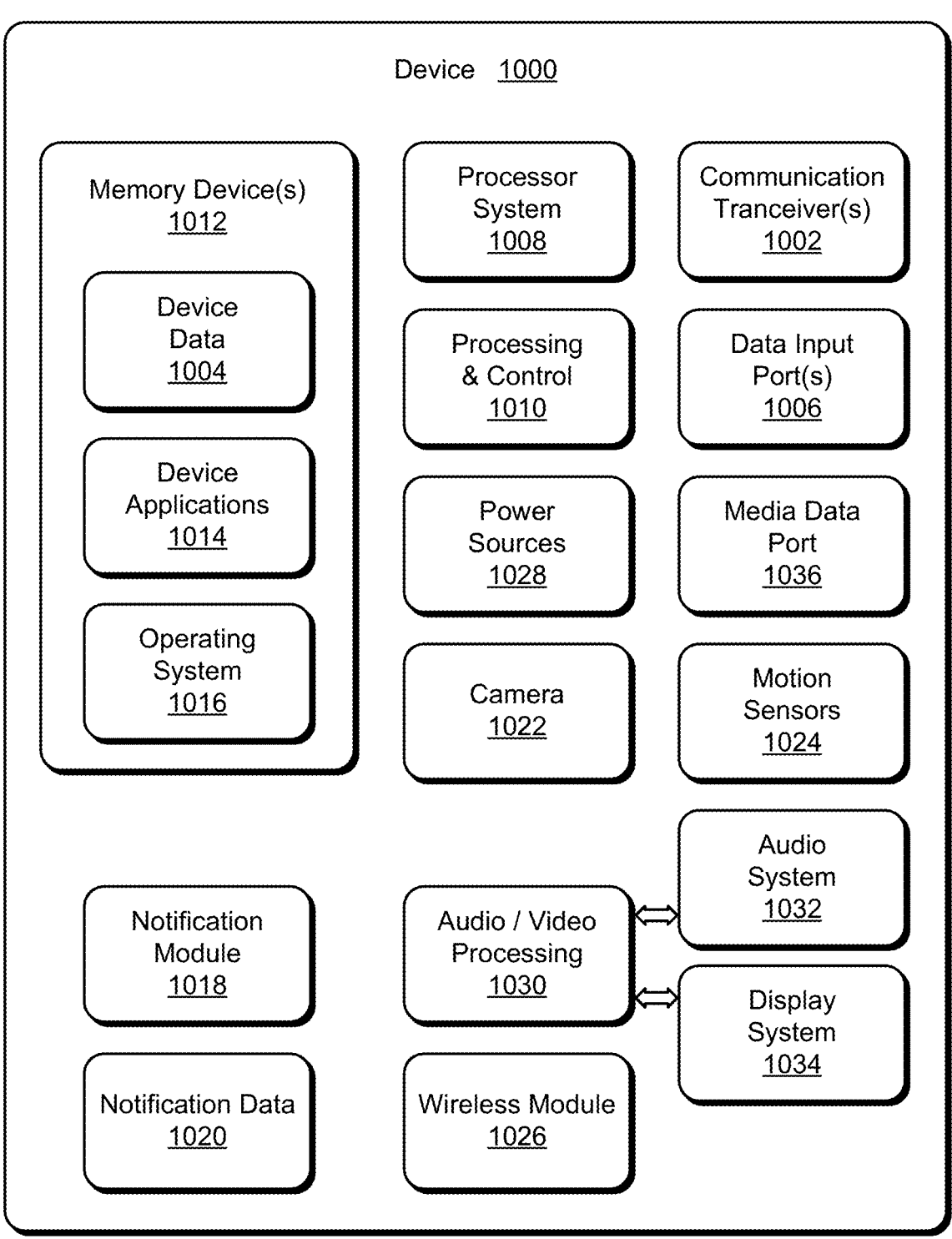
FIG. 10 illustrates various components of an example device that can implement aspects of notification handling based on identity and physical presence.

FIG. 10 illustrates various components of an example device 1000 in which aspects of notification handling based on identity and physical presence can be implemented. The example device 1000 can be implemented as any of the devices described with reference to the previous FIGS. 1-9, such as any type of mobile device, mobile phone, mobile device, wearable device, tablet, computing, communication, entertainment, gaming, media playback, and/or other type of electronic device. For example, the mobile device 102 and/or the display device 104 as shown and described with reference to FIGS. 1-9 may be implemented as the example device 1000. In a wearable device implementation, the device may include any one or combination of a watch, armband, wristband, bracelet, glove or pair of gloves, glasses, jewelry items, clothing items, any type of footwear or headwear, and/or other types of wearables.

The device 1000 includes communication transceivers 1002 that enable wired and/or wireless communication of device data 1004 with other devices. The device data 1004 can include any of device identifying data, device location data, wireless connectivity data, and wireless protocol data. Additionally, the device data 1004 can include any type of audio, video, and/or image data. Example communication transceivers 1002 include wireless personal area network (WPAN) radios compliant with various IEEE 1002.15 (Bluetooth™) standards, wireless local area network (WLAN) radios compliant with any of the various IEEE 1002.11 (Wi-Fi) standards, wireless wide area network (WWAN) radios for cellular phone communication, wireless metropolitan area network (WMAN) radios compliant with various IEEE 1002.16 (WiMAX™) standards, and wired local area network (LAN) Ethernet transceivers for network data communication.

The device 1000 may also include one or more data input ports 1006 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 1000 includes a processing system 1008 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 1010. The device 1000 may further include any type of a system bus or other data and command transfer system that couples the various components within the device. A system bus can include any one or combination of different bus structures and architectures, as well as control and data lines.

The device 1000 also includes computer-readable storage memory 1012 (e.g., memory devices) that enable data storage, such as data storage devices that can be accessed by a computing device, and that provide persistent storage of data and executable instructions (e.g., software applications, programs, functions, and the like). Examples of the computer-readable storage memory 1012 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 1000 may also include a mass storage media device.

The computer-readable storage memory 1012 provides data storage mechanisms to store the device data 1004, other types of information and/or data, and various device applications 1014 (e.g., software applications). For example, an operating system 1016 can be maintained as software instructions with a memory device and executed by the processing system 1008. The device applications may also include a device manager, such as any form of a control application, software application, signal-processing and control module, code that is native to a particular device, a hardware abstraction layer for a particular device, and so on. Computer-readable storage memory 1012 represents media and/or devices that enable persistent and/or non-transitory storage of information in contrast to mere signal transmission, carrier waves, or signals per se. Computer-readable storage memory 1012 do not include signals per se or transitory signals.

In this example, the device 1000 includes a notification module 1018 that implements aspects of notification handling based on identity and physical presence and may be implemented with hardware components and/or in software as one of the device applications 1014. For example, the notification module 1018 can be implemented as the notification module 128 described in detail above. In implementations, the notification module 1018 may include independent processing, memory, and logic components as a computing and/or electronic device integrated with the device 1000. The device 1000 also includes notification data 1020 for implementing aspects of notification handling based on identity and physical presence and may include data from the notification module 1018.

In this example, the example device 1000 also includes a camera 1022 and motion sensors 1024, such as may be implemented in an inertial measurement unit (IMU). The motion sensors 1024 can be implemented with various sensors, such as a gyroscope, an accelerometer, and/or other types of motion sensors to sense motion of the device. The various motion sensors 1024 may also be implemented as components of an inertial measurement unit in the device.

The device 1000 also includes a wireless module 1026, which is representative of functionality to perform various wireless communication tasks. For instance, for the mobile device 102 and/or the display device 104, the wireless module 1026 can be leveraged to scan for and detect wireless networks, as well as negotiate wireless connectivity to wireless networks for the mobile device 102 and/or the display device 104. Alternatively or additionally the wireless module 1026 can enable direct device-to-device wireless connectivity between the mobile device 102 and the display device 104. The device 1000 can also include one or more power sources 1028, such as when the device is implemented as a mobile device. The power sources 1028 may include a charging and/or power system, and can be implemented as a flexible strip battery, a rechargeable battery, a charged super-capacitor, and/or any other type of active or passive power source.

The device 1000 also includes an audio and/or video processing system 1030 that generates audio data for an audio system 1032 and/or generates display data for a display system 1034. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1036. In implementations, the audio system and/or the display system are integrated components of the example device. Alternatively, the audio system and/or the display system are external, peripheral components to the example device.

Although implementations of notification handling based on identity and physical presence have been described in language specific to features and/or methods, the subject of the appended claims is not necessarily limited to the specific features or methods described. Rather, the features and methods are disclosed as example implementations, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

In addition to the previously described methods, any one or more of the following:

In some aspects, the techniques described herein relate to a method, including: determining that a first device receives a notification while content is being communicated from the first device to a second device for output at the second device; receiving, at the first device, sensor data that includes state conditions for a physical environment in which one or more of the first device or the second device is present; detecting, from the sensor data, one or more identities for one or more persons detected from the sensor data; identifying, based on the one or more identities, a notification profile that specifies one or more parameters for handling a notification; and determining, by the first device, whether to deliver the notification to the second device based on the notification profile.

In some aspects, the techniques described herein relate to a method, wherein the detecting the one or more identities and identifying the notification profile are performed dynamically in real time while the content is being communicated from the first device to the second device.

In some aspects, the techniques described herein relate to a method, wherein the detecting the one or more identities and identifying the notification profile are performed independently from the determining that the first device receives the notification.

In some aspects, the techniques described herein relate to a method, wherein the one or more identities include: an identity of a registered user of the first device; and one or more other identities that correspond to one or more persons that have a specified relationship with the registered user, wherein the identifying the notification profile is based on the specified relationship.

In some aspects, the techniques described herein relate to a method, wherein the notification profile specifies that based on the specified relationship the notification is not to be delivered, and wherein the determining whether to deliver the notification includes determining not to deliver the notification to the second device.

In some aspects, the techniques described herein relate to a method, wherein the specified relationship indicates that the one or more other identities have one or more of a family or friend relationship with the registered user, and the notification profile indicates that only priority notifications are to be delivered to the second device.

In some aspects, the techniques described herein relate to a method, wherein the one or more identities include an identity of a registered user of the first device, wherein the detecting further includes detecting, from the sensor data, an unrecognized identity for the one or more persons, and wherein the notification profile indicates that only emergency notifications are to be delivered to the second device.

In some aspects, the techniques described herein relate to a method, wherein the one or more identities include an identity of a registered user of the first device, and wherein the notification profile indicates that all notifications are to be delivered to the second device.

In some aspects, the techniques described herein relate to a mobile device including: a sensor system including one or more sensors; and a notification module implemented at least in part in hardware of the mobile device to: receive at the mobile device a notification while content is being communicated from the mobile device to an external display device for output at the external display device; detect, based on sensor data collected by the sensor system, one or more identities for one or more persons detected from the sensor data; identify, based on the one or more identities, a notification profile that specifies one or more parameters for handling a notification; and determine, based on the notification profile, whether to deliver the notification for output by the external display device.

In some aspects, the techniques described herein relate to a mobile device, wherein the notification module is implemented to detect the one or more identities and identify the notification profile dynamically in response to the content being communicated from the mobile device to the external display device.

In some aspects, the techniques described herein relate to a mobile device, wherein the one or more identities include an identity of a registered user of the mobile device, and wherein the one or more parameters of the notification profile indicate that all notifications are to be delivered to the external display device in conjunction with the content being communicated from the mobile device to the external display device.

In some aspects, the techniques described herein relate to a mobile device, wherein the one or more identities include an identity of a registered user of the mobile device and one or more other identities for one or more persons that have an identified relationship with the registered user, and wherein the one or more parameters specify how the notification is to be handled based on the specified relationship.

In some aspects, the techniques described herein relate to a mobile device, wherein the one or more identities include an identity of a registered user of the mobile device, the notification module is further implemented to detect, based on the sensor data, an unrecognized identity from the one or more persons, and wherein the one or more parameters for the notification profile are based a presence of an unrecognized identity.

In some aspects, the techniques described herein relate to a mobile device, wherein the notification module is implemented to detect the unrecognized identity from the one or more persons based on non-visual sensor data detected by the sensor system.

In some aspects, the techniques described herein relate to a system including: one or more processors; and one or more computer-readable storage media storing instructions that are executable by the one or more processors to: receive at a mobile device a notification while content is communicated from the mobile device to an external display device for output at the external display device; detect, based on sensor data collected by a sensor system, physical presence of one or more persons in proximity to the mobile device; identify, based on the physical presence of one or more persons, a notification profile that specifies one or more parameters for handling the notification; and determine, based on the one or more parameters, whether to deliver the notification for output by the external display device.

In some aspects, the techniques described herein relate to a system, wherein the instructions are executable by the one or more processors to: detect, based on the sensor data, one or more physical attributes of the one or more persons; match the physical attributes to one or more known identities; and identify the notification profile based on the one or more known identities.

In some aspects, the techniques described herein relate to a system, wherein the instructions are executable by the one or more processors to detect the physical presence based on non-visual sensor data collected by the sensor system.

In some aspects, the techniques described herein relate to a system, wherein the non-visual sensor data includes one or more of temperature-based sensor data or audio-based sensor data.

In some aspects, the techniques described herein relate to a system, wherein the instructions are executable by the one or more processors to determine, based on the non-visual sensor data, that the one or more persons include an unrecognized identity, and wherein the one or more parameters of the notification profile are based on the presence of an unrecognized identity.

In some aspects, the techniques described herein relate to a system, wherein the one or more parameters specify that only emergency notifications are to be delivered when an unrecognized identity is detected, and wherein the instructions are executable by the one or more processors to determine whether to deliver the notification based on whether the notification is determined to be an emergency notification.

What is claimed is:

1. A mobile device comprising:

a sensor system including one or more sensors; and a processor configured to:

receive a notification at the mobile device;

detect, based on sensor data collected by the sensor system, a physical presence of a registered user of the mobile device and a physical presence of one or more persons other than the registered user of the mobile device;

identify a notification profile that specifies one or more parameters for handling the notification based at least in part on the physical presence of the one or more persons other than the registered user of the mobile device, wherein the notification profile specifies, based on the physical presence of the one or more persons other than the registered user of the mobile device, that the notification is not to be delivered to an external display device; and determine, based on the notification profile, whether to deliver the notification for output by the external display device connected to the mobile device.

2. The mobile device as described in claim 1, wherein the notification profile specifies, based on the physical presence of the one or more persons other than the registered user of the mobile device, that only priority notifications are to be delivered to the external display device.

3. The mobile device as described in claim 2, wherein the priority notifications include one or more of a work notification or an emergency notification.

4. The mobile device as described in claim 1, wherein the sensor data includes visual features including images of physical objects in proximity to the external display device.

5. The mobile device as described in claim 1, wherein the sensor data includes non-visual sensor input including sound, temperature, or motion detected in proximity to the external display device.

6. The mobile device as described in claim 1, wherein the physical presence is based on a proximity of the registered user and the one or more persons to the external display device or a proximity to the mobile device.

7. The mobile device as described in claim 1, wherein the mobile device receives the notification while content is being communicated from the mobile device to the external display device for display by the external display device.

8. The mobile device as described in claim 7, wherein the processor determines whether to deliver the notification based in part on a type of content being communicated from the mobile device to the external display device for display by the external display device.

9. A method comprising:

receiving a notification at a mobile device while content is being communicated from the mobile device to an external display device;

receiving sensor data at the mobile device that indicates a physical presence of one or more persons in proximity to the external display device or the mobile device, wherein the sensor data indicates that only one person is in proximity to the external display device or the mobile device;

identifying a notification profile that specifies one or more parameters for handling the notification based at least in part on the sensor data and the physical presence of the one or more persons, wherein the notification profile corresponds to a solo profile that specifies that all notifications received by the mobile device are to be delivered to the external display device for display; and determining, based on the notification profile, whether to deliver the notification for output by the external display device.

10. The method as described in claim 9, wherein the determining whether to deliver the notification is based in part on detecting a type of content being communicated from the mobile device to the external display device.

11. The method as described in claim 10, wherein the type of content is detected to be work content, and that based on detecting the work content the notification profile is identified as a work-related notification profile that specifies that all notifications are to be delivered while work content is being delivered from the mobile device to the external display device.

12. The method as described in claim 10, wherein the type of content is detected to be media content, and that based on detecting the media content the determining whether to deliver the notification for output by the external display device is based only on the one or more parameters of the notification profile.

13. A system comprising:

one or more processors; and one or more computer-readable storage media storing instructions that are executable by the one or more processors to:

receive a notification at a first device while content is being communicated from the first device to a second device for display by the second device;

detect, based on sensor data collected by a sensor system, a physical presence of multiple persons in proximity to the second device;

identify a notification profile that specifies one or more parameters for handling the notification based at least in part on the physical presence of the multiple persons; and determine, based on the notification profile, whether to deliver the notification for display by the second device, wherein the notification profile specifies that the notification is not to be delivered from the first device to the second device.

14. The system as described in claim 13, wherein the one or more processors determine not to deliver the notification to the second device.

15. The system as described in claim 13, wherein the notification profile specifies that only an emergency notification is to be delivered from the first device to the second device in the physical presence of the multiple persons.

16. The system as described in claim 13, wherein the sensor system includes a temperature sensor, and the detection of the physical presence of the multiple persons is based on a temperature profile obtained by the temperature sensor that indicates multiple persons are in proximity to the second device.

17. The system as described in claim 13, wherein the sensor system includes an audio sensor, and the detection of the physical presence of the multiple persons is based on a detection of the audio sensor that multiple voices are in proximity to the second device.

18. The system as described in claim 13, wherein the instructions are executable by the one or more processors to detect, based on sensor data collected by the sensor system, an updated condition in which only one person is in proximity to the second device, and the notification profile corresponds to a solo profile that specifies that all notifications received by the first device are to be delivered to the second device for display.

19. The system as described in claim 13, wherein the detection of the physical presence of the multiple persons is based in part on recognizing facial features in the sensor data that indicates multiple persons are in proximity to the second device.

20. The system as described in claim 19, wherein the detection of the physical presence of the multiple persons includes determining an identity of one or more of the multiple persons based on the facial features and the notification profile is identified based in part on the identity of the one or more of the multiple persons.

\* \* \* \* \*